INVENTORS
WARREN D. NUTTEN &
BY NORMAN F. HOLLAND

Harry O. Ernsberger
ATTORNEY

INVENTORS
WARREN D. NUTTEN &
BY NORMAN F. HOLLAND
Harry O. Ernsberger
ATTORNEY

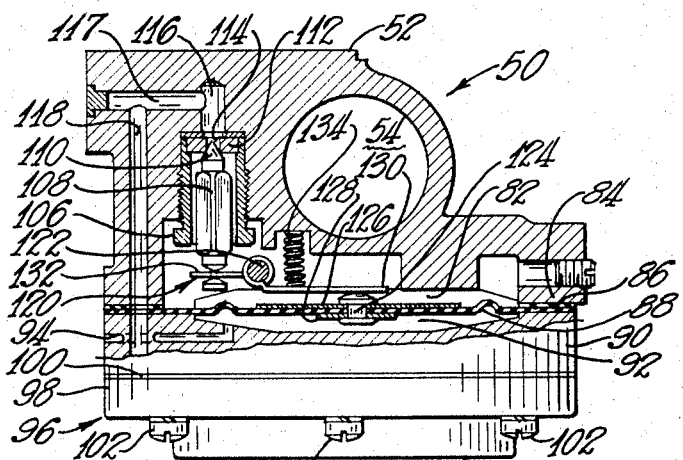
Fig. 6
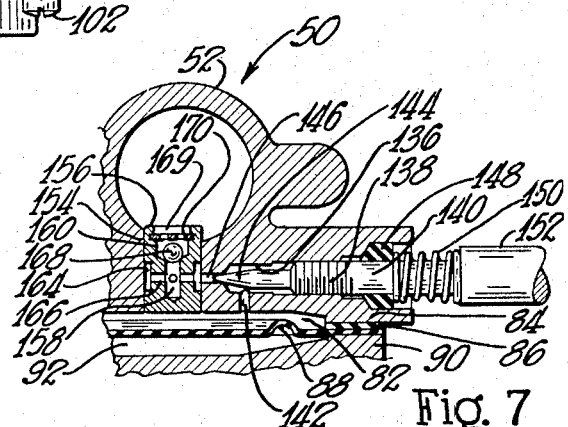
Fig. 7
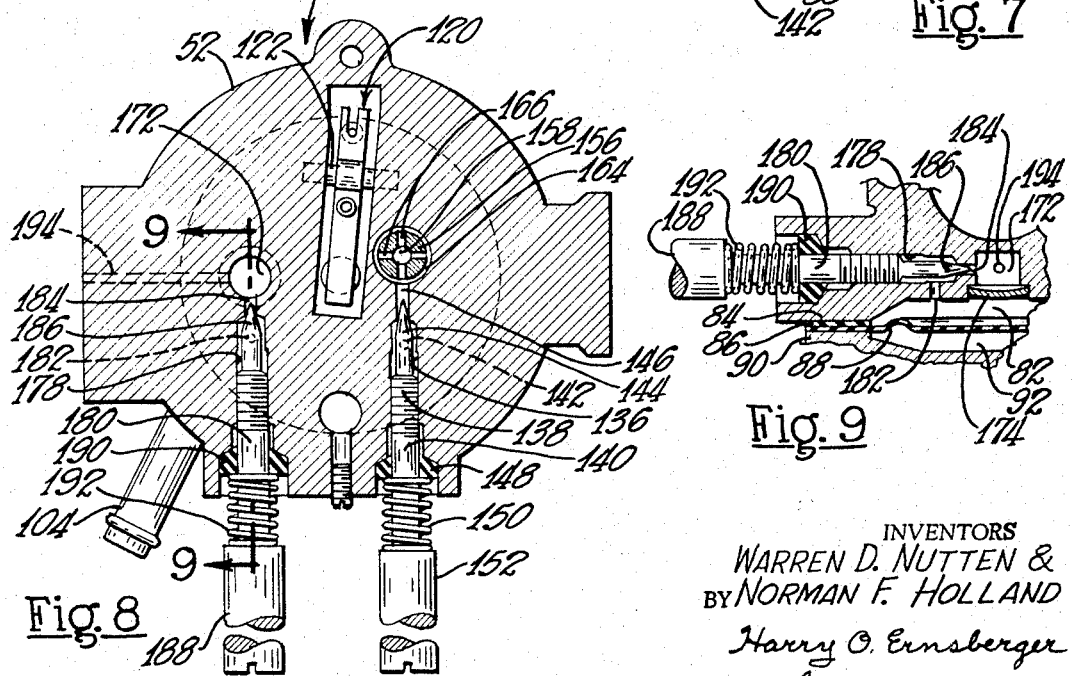
Fig. 8
Fig. 9
INVENTORS
WARREN D. NUTTEN &
BY NORMAN F. HOLLAND
Harry O. Ernsberger
ATTORNEY

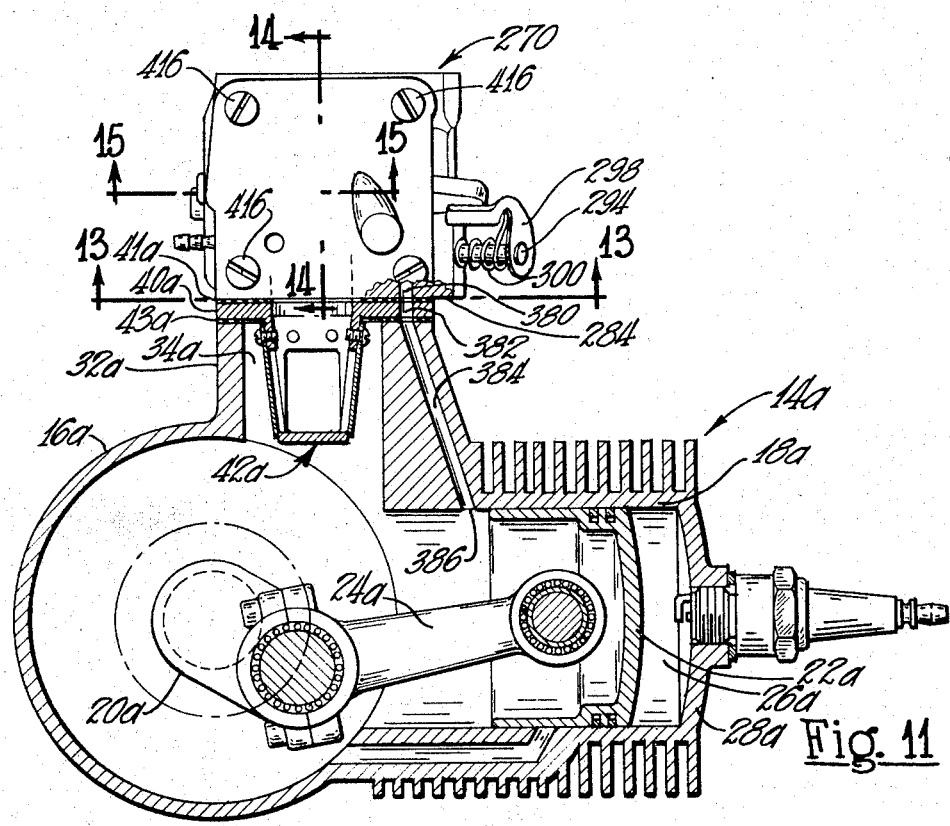
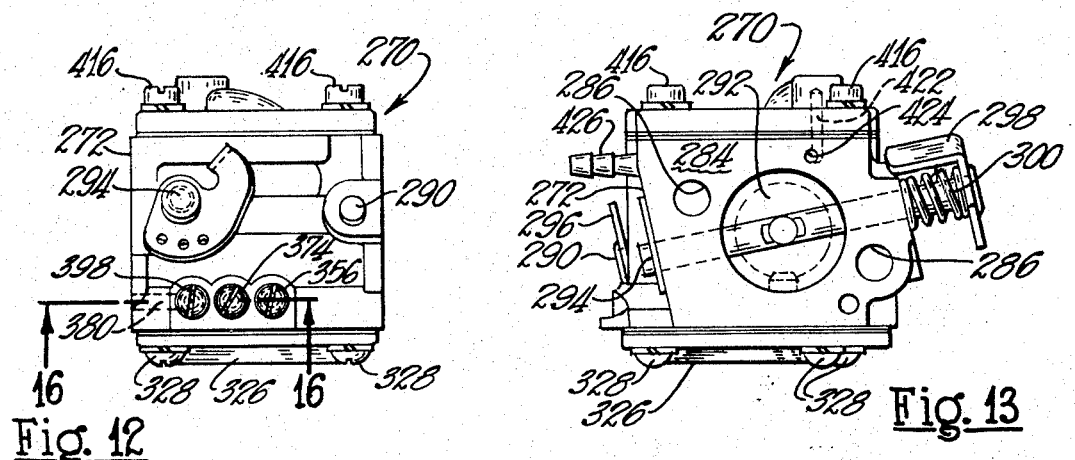

INVENTORS
WARREN D. NUTTEN &
BY NORMAN F. HOLLAND

Harry O. Ernsberger
ATTORNEY

United States Patent Office 3,453,994
Patented July 8, 1969

3,453,994
FUEL FEED SYSTEM AND CHARGE FORMING APPARATUS
Warren D. Nutten, Erie, Mich., and Norman F. Holland, Toledo, Ohio, assignors to The Tillotson Manufacturing Company, Toledo, Ohio, a corporation of Ohio
Filed July 11, 1966, Ser. No. 564,240
Int. Cl. F02b 33/04; F02m 3/08, 17/02
U.S. Cl. 123—73                                      3 Claims

ABSTRACT OF THE DISCLOSURE

The disclosure relates to a fuel feed system for a two cycle internal combustion engine wherein fuel for engine idling purposes is delivered into the crankcase of the engine independently of the main fuel mixture delivery system of the carburetor or charge forming device of the aspirated type.

---

This invention relates to fuel feed system and charge forming apparatus for an internal combustion engine and more especially to a fuel feed system and charge forming apparatus for use with engines of the two cycle type for operating chain saws or other implements or instrumentalities where the engine and the fuel feed system and charge forming apparatus are required to function in various angular positions and in inverted position.

Engines of the two cycle or two stroke type equipped with charge forming apparatus of the aspirated diaphragm type have come into general use particularly for chain saws which must function in all angular and inverted positions. The type of aspirated carburetor or charge forming device conventionally employed with two cycle engines is provided with a main fuel delivery orifice for delivering fuel into a mixing passage for normal and high speed engine operation and an engine idling and low speed orifice means for engine idling operation and low speed engine operation.

The charge forming apparatus or carburetor of this character is equipped with a disc type throttle valve which, in engine idling position is nearly closed, the idling orifice opening into the carburetor mixing passage on the downward stream or engine side of the throttle valve. In certain angular positions of the engine and carburetor, engine idling operation may be seriously impaired and under certain conditions the engine tends to stall. For example, when the engine is tipped to an angular position in which the carburetor mixture outlet is pointed upwardly during engine idling, some of the liquid fuel tends to collect in a puddle adjacent the nearly closed throttle valve. With the carburetor in this position the engine may continue to idle but irratically because of a leaned fuel supply. When the engine and carburetor are thereafter tilted to positions where the mixture outlet of the carburetor is pointed downwardly, without opening the throttle, the puddle of fuel may be discharged quickly into the engine crankcase, over-enrichening the mixture and causing the engine to stall. Two cycle engines equipped with the conventional reed valves for controlling the admission of mixture from the carburetor into the engine crankcase are prone to manifold loading of fuel in various angular positions, the degree of loading and consequent impairment of engine operation during engine idling being usually dependent upon the particular angular position of the engine and carburetor.

The present invention embraces a fuel feed system for a two-cycle internal combustion engine wherein the fuel for engine idling purposes is delivered from a fuel chamber in the charge forming apparatus or carburetor directly into the crankcase of the engine.

Another object of the invention embraces a fuel feed system for a two cycle internal combustion engine wherein liquid fuel for engine idling purposes is delivered from a fuel chamber in the carburetor directly into the crankcase and wherein air is admitted at a controlled rate to provide a combustible mixture for engine idling.

An object of the invention resides in a fuel feed system for a two cycle internal combustion engine wherein fuel for engine idling purposes is delivered into the engine crankcase independently of the main fuel mixture delivery system whereby to minimize wetting of the engine crankcase and manifold arrangement with liquid fuel and to prevent collection or puddling of fuel in the manifold system and particularly adjacent the throttle valve during engine idling operation.

Another object of the invention resides in a fuel feed method or system for delivering fuel from a carburetor fuel chamber directly into the engine crankcase for engine idling purposes in a manner whereby the delivery of engine idling fuel is assured irrespective of the position of tilt of the engine and carburetor and provide for improved engine idling operation in all positions of the engine.

Another object of the invention resides in a fuel feed system for a two cycle internal combustion engine, the system including a charge forming device or carburetor having a mixing passage utilized for forming a combustible fuel and air mixture in a mixing passage for normal and high speed engine operation, the system including means bypassing the mixing passage in communication with the engine crankcase for conveying fuel for engine idling purposes directly into the engine crankcase.

Another object of the invention embraces a fuel feed system for a two cycle internal combustion engine wherein a fuel and air mixture for normal and high speed engine operation is delivered from the mixing passage of a carburetor and wherein fuel for engine idling purposes is delivered from the carburetor independently of the mixing passage into the engine crankcase through a bypass and port in the cylinder wall of the engine, the port being in a region wherein the piston of the engine intermittently obturates or covers the port of the bypass whereby fuel for engine idling purposes is admitted into the engine crankcase in the proper periods of reciprocation of the engine piston to provide a fuel and air mixture in the engine crankcase at each revolution of the engine to attain improved engine idling operation.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 6 is an enlarged transverse sectional view through the carburetor, the section being taken substantially on the line 6—6 of FIGURE 3;

FIGURE 7 is a fragmentary detail sectional view taken substantially on the line 7—7 of FIGURE 3;

FIGURE 8 is a horizontal sectional view through the carburetor, the view being taken substantially on the line 8—8 of FIGURE 4;

FIGURE 9 is a fragmentary detail sectional view taken substantially on the line 9—9 of FIGURE 8;

FIGURE 11 is a sectional view similar to FIGURE 1 illustrating a modified form of carburetor or charge forming device and fuel pump associated with a two cycle engine and embodying the fuel feed system of the invention;

FIGURE 12 is a side elevational view of the carburetor and fuel pump illustrated in FIGURE 11;

FIGURE 13 is an end view of the carburetor and fuel pump, the view being taken substantially on the line 13—13 of FIGURE 11;

While the carburetor or charge forming apparatus and fuel feed system of the invention has particular utility for two cycle engines used for powering chain saws where the engine and carburetor are used in various angular and inverted positions, it is to be understood that the fuel feed system of the invention may be used with two cycle engines utilized for other purposes.

Figure 1:
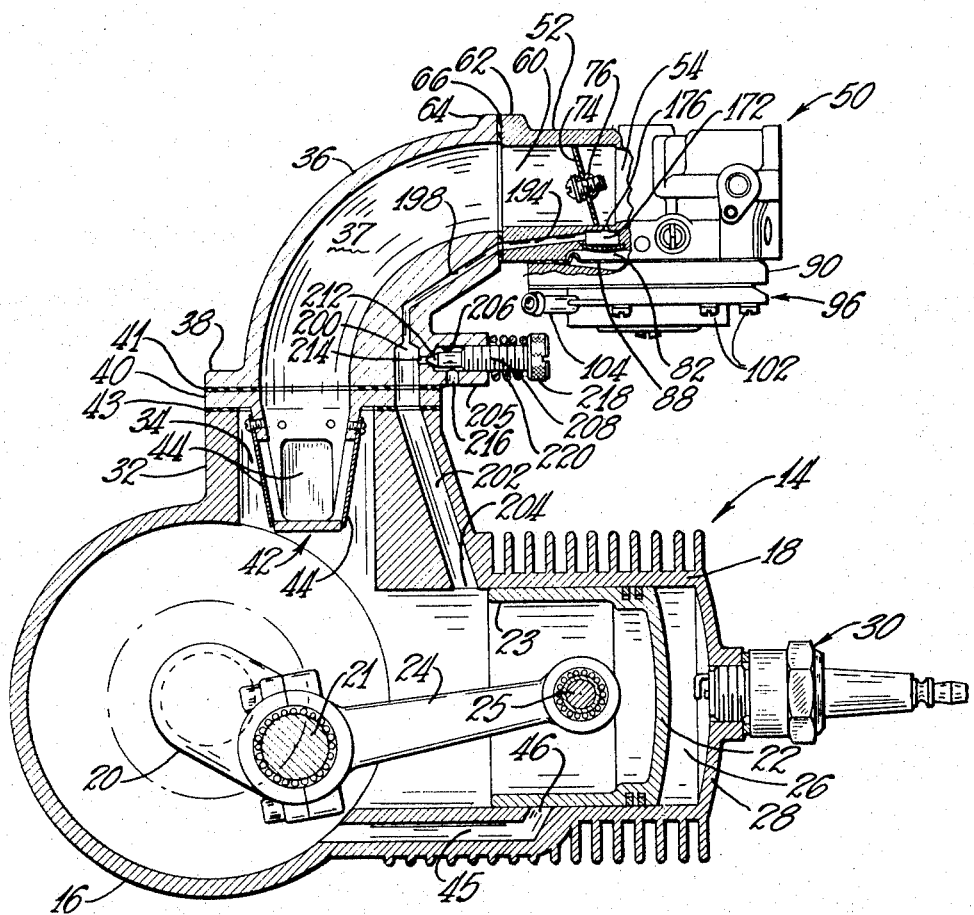
FIGURE 1 is a longitudinal sectional view of a two cycle engine illustrating a combined fuel pump and carburetor or charge forming apparatus and fuel feed system of the invention associated therewith.
Figure 2:
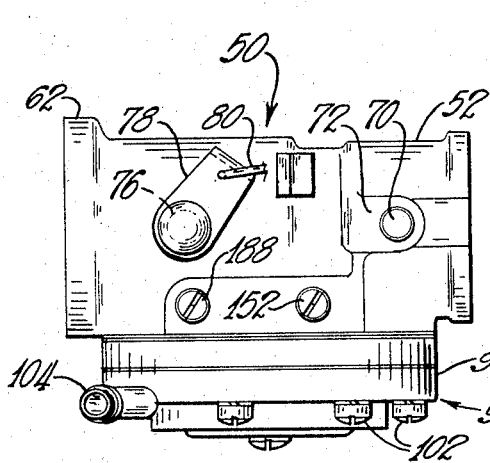
FIGURE 2 is a side elevational view of a form of fuel pump and carburetor shown in FIGURE 1 and forming a component of the fuel feed system.
Figure 3:
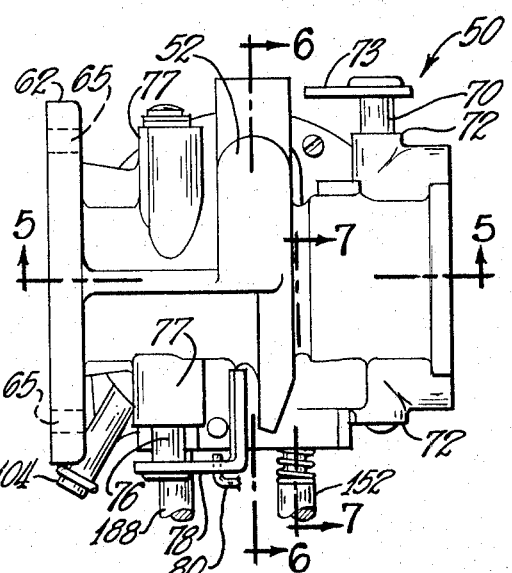
FIGURE 3 is a top plan view of the carburetor shown in FIGURE 2.
Figure 4:
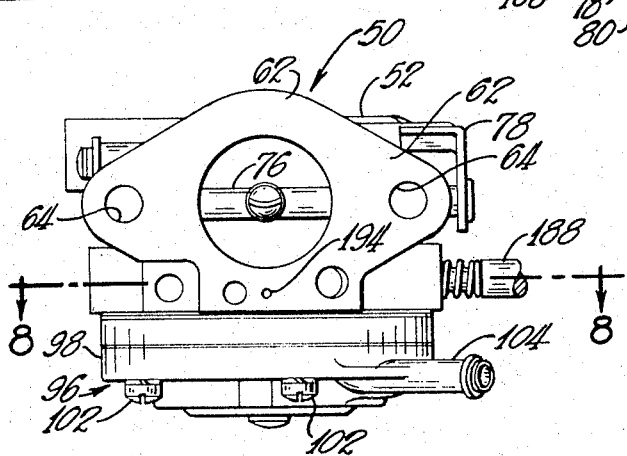
FIGURE 4 is an end view of the carburetor and fuel pump illustrated in FIGURE 2.

Referring to the drawings in detail and initially to FIGURE 1, there is illustrated a semischematic longitudinal sectional view of a two cycle engine of the reciprocating piston type in association with a charge forming apparatus or carburetor and fuel pump, a mixture delivery manifold and an engine idling arrangement wherein liquid fuel is conveyed from a fuel chamber and carburetor directly into the engine crankcase independently of the mixture conveying manifold and mixing passage of the carburetor.

The engine 14 is of the two cycle type and is inclusive of a crankcase 16 and a cylinder 18, a crankshaft 20 being journaled in the crankcase in the conventional manner. A piston 22, having a skirt portion 23, is reciprocable in the cylinder 18. A crank pin 21 of the crankshaft 20 is connected by a connecting rod 24 with a wrist pin 25 of the piston in the conventional manner. The space 26 between the piston 22 and the head 28 of the cylinder provides a combustion chamber wherein mixture is ignited at each revolution of the crankshaft by a conventional spark plug 30.

The engine crankcase is fashioned with a boss provided with a mixture inlet port 34 which receives combustible mixture from a manifold 36 of conventional construction. Disposed between the boss 32 and a flange 38 on the manifold 36 is an insert, plate or member 40 which supports the conventional reed valve construction 42 which controls the admission of mixture into the crankcase. Disposed at each side of the insert or member 40 are sealing gaskets 41 and 43.

The reed valves 44 of the valve construction 42 are automatically opened upon a compression stroke of the piston 22 as it moves upwardly in the cylinder to admit mixture from the manifold passage or chamber 37 into the crankcase 16, the reeds automatically closing during the power stroke of the piston 22 to compress the mixture in the crankcase chamber. A mixture conveying passage 45 fashioned in the wall of the cylinder 18 conveys compressed fuel and air mixture from the crankcase chamber through a port 46 into the region above the piston 22 when the head of the piston is below the port 46 of the passage 45.

A carburetor or charge forming apparatus 50 forming a component of the fuel feed system is illustrated in FIGURES 1 through 8. The carburetor illustrated is of the diaphragm type wherein fuel for the engine is admitted from the fuel pump 96 associated with the carburetor into a fuel chamber in the carburetor under the influence of aspiration or reduced pressure set up or established in the crankcase during movements of the piston toward the cylinder head 18.

The carburetor illustrated in FIGURES 1 through 8 includes a body or body member 52 preferably fashioned of die cast metal, the body having a longitudinally arranged mixing passage 54 in which liquid fuel and air are mixed to provide a combustible mixture for delivery through the manifold 36 into the crankcase of the engine for normal and high speed engine operation. The mixing passage 54 includes an air inlet or inlet region 56, a Venturi 58 and a mixture outlet region 60 which is in registration with the manifold chamber 37 of the manifold 36.

The carburetor body 52 is fashioned with a mounting flange 62 having a planar surface which mates with a flange 64 provided on the manifold 36, the mixture outlet of the mixing passage being at the planar surface. The mounting flange 62 of the carburetor body is fashioned with openings 65 to receive securing bolts (not shown) threaded into openings in the manifold flange 64 for securing the carburetor 50 to the manifold 36. A sealing gasket 66 is disposed between the planar surfaces of the flanges 62 and 64. A suitable air filter (not shown) of conventional construction may be provided at the entrance of the air inlet 56.

Disposed in the air inlet region of the mixing passage is a disc type choke valve 68 of conventional construction mounted upon a shaft 70 extending across the mixing passage and journaled for rotation in bores provided in boss portions 72 integral with the body 52. Secured on the shaft 70 is an arm 73 for manipulating the choke valve 68 in starting the engine with which the carburetor is used. The mixture outlet 60 is equipped with a disc-type throttle valve 74 mounted upon a shaft 76 journaled in bores provided in boss portions 77. The shaft 76 has an arm 78 connected with a rod 80 for manipulating the throttle valve 74.

Figure 5:
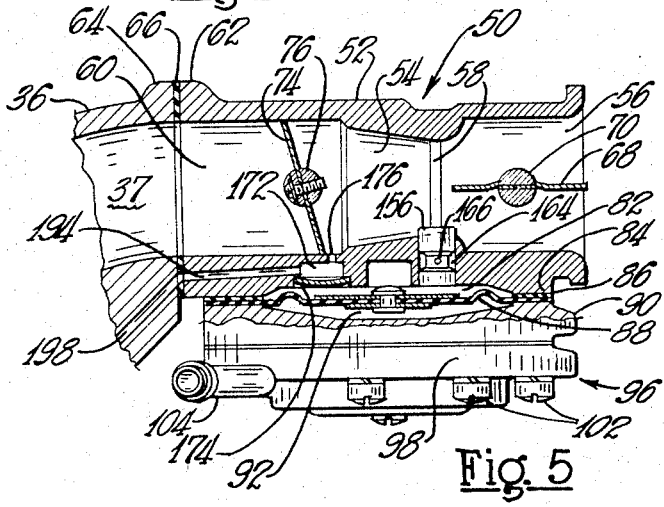
FIGURE 5 is a longitudinal sectional view through the carburetor, the section being taken substantially on the line 5—5 of FIGURE 3.

As shown in FIGURES 5, 6 and 7, the carburetor body 52 is formed with a generally circular recess providing a shallow fuel chamber 82 defined by an annular boss 84 upon which is disposed an annular gasket 86. A flexible diaphragm or membrane 88 formed of impervious material, resistant to deterioration of hydrocarbon fuels, extends across the shallow fuel chamber 82 forming a flexible wall of the chamber providing a chamber of variable volume due to flexing movement of the diaphragm.

The periphery of the diaphragm is contiguous with the sealing gasket 86. A member 90 provides a cover for the diaphragm and is fashioned with a shallow recess 92 to accommodate flexing movements of the diaphragm 88, the recess 92 being vented to the atmosphere through a vent passage 94. A fuel pump construction generally indicated at 96 is of the diaphragm type wherein a pumping diaphragm is vibrated or pulsated by varying fluid pressures in the engine crankcase through a passage (not shown) connected with a pumping chamber of the fuel pump construction.

The housing component 98 of the pump construction is contiguous with the cover member 90, the pumping diaphragm 100 being disposed between the member 90 and the pump housing 98. These components are provided with openings to receive threaded members or screws 102 which extend into threaded openings in the carburetor body 52 to secure the diaphragm 88, cover member 90, pump housing 98 and the pumping diaphragm 100 in assembled relation.

The fuel pump body 98 is equipped with a tubular nipple 104 for connection with a fuel supply tank (not shown). The fuel pump is of the general character shown in Phillips Patent 2,903,250. As the pump construction forms no part of the invention it will not be described in further detail.

The diaphragm 88 is arranged to control or meter the flow of liquid fuel delivered from the fuel pump into the fuel chamber 82 in accordance with the rate of delivery of the fuel from the fuel chamber 82 to the engine crankcase as hereinafter described.

As shown in FIGURE 6, the body 52 is provided with a threaded bore accommodating a tubular fitting 106. Slidably disposed within the fitting is an inlet valve body 108 of polygonal cross-section to facilitate fuel flow past the valve body into the fuel chamber 82.

The valve body 108 is fashioned with a needle valve portion 110 cooperating with an annular valve seat 112 having a port 114, the seat 112 being secured in position by the fitting 106. The port 114 is in communication with the outlet of the fuel pump by means of interconnected inlet passages 116, 117 and 118 to facilitate fuel flow into the chamber 82 past the valve 110. Disposed in the fuel chamber 82 is a lever 120 fulcrumed upon a pin 122 mounted in recesses provided in the body 52.

The diaphragm 88 is provided with a headed rivet 124 securing reinforcing discs 126 and 128 contiguous with the diaphragm at opposite sides thereof. The head of the rivet engages the long arm 130 of the lever 120, the short arm 132 of the lever having articulate connection or interengagement with the lower end of the inlet valve body 108. An expansive coil spring 134 engages the long arm of the lever 120 and exerts a small force normally biasing the inlet valve needle portion 110 to close the port 114.

When the diaphragm 88 is flexed upwardly by aspiration or reduced pressure in the mixing passage, communicated to the fuel chamber 82 as hereinafter described, the lever 120 is pivotally moved in a counterclockwise direction as viewed in FIGURE 6 causing opening of the inlet valve whereby liquid fuel is admitted from the inlet passage 116 into the fuel chamber 82.

The carburetor body 52 is provided with channels or passage means for conveying fuel from the chamber 82 into the mixing passage 54 to provide fuel and air mixture for normal and high speed engine operation. As shown in FIGURES 7 and 8, the body 52 is provided with a bore 136 having a threaded region accommodating a threaded portion 138 of a valve body 140. The bore 136 receives fuel from chamber 82 through a passage 142. A needle valve portion 144 of the valve member 140 extends into a restricted passage 146 for regulating fuel flow to a main orifice.

A sealing gasket 148 surrounds the valve body 140 and an expansive coil spring 150 is disposed between the gasket 148 and an enlarged portion 152 of the valve body to establish friction adequate to retain the valve body 140 in adjusted position. The body 52 is fashioned with a bore 154, and snugly fitted or pressed into the bore is a cylindrically-shaped fitting 156 having an axial bore 158 and a counterbore 160, the outlet of the counterbore opening into the mixing passage providing a main orifice 169 for fuel delivery into the Venturi 58 of the mixing passage 54.

The fitting 156 has a circular recess 164 in communication with a restricted passage 146. Communication between the circular recess 164 and the fuel duct 158 is provided by transverse passages 166. A ball check valve 168, preferably of nylon or other light weight material, is disposed in the counterbore 160, a perforated grid 170 preventing dislodgment of the check valve 168.

The ballcheck valve 168 is of a size to facilitate fuel flow past the valve and into the mixing passage but is adapted to seat on the ledge at the juncture of the bore 158 with the counterbore 160, as shown in FIGURE 7, to prevent back bleeding of air through the main orifice into an engine idling fuel delivery system when the latter is delivering fuel into the engine crankcase through a channel system bypassing the mixing passage.

The arrangement for conveying fuel for engine idling purposes independently of the mixing passage into the engine crankcase is illustrated in FIGURES 1, 5, 8 and 9. The carburetor body 52 is provided with a supplemental fuel chamber 172, a Welch plug 174 forming a wall of the chamber. As shown in FIGURES 1 and 5 an orifice 176 opens into the mixing passage from the supplemental chamber 172 at a region at the upstream side of the throttle valve with the throttle valve in closed position as shown. With the throttle valve 74 in closed or engine-idling position no fuel flows through the orifice 176.

Fuel conveying channels for engine idling fuel and flow control for the fuel are shown in FIGURES 8 and 9. The carburetor body 52 is fashioned with a bore 178 having a threaded portion accommodating the threaded portion of a second valve body 180. The bore 178 is in communication with the fuel chamber 82 by a passage 182 and with the supplemental chamber 172 by a restricted passage 184.

The valve body 180 has a tapered or needle valve portion 186 extending into and cooperating with the restricted passage 184 for regulating fuel flow from chamber 82 into the supplemental chamber 172.

The valve body 180 has an enlarged portion 188 for manipulating or adjusting the needle valve portion 186. An annular sealing gasket 190 surrounding the valve body prevents seepage of fuel along the body. An expansive spring 192 disposed between the enlarged portion 188 and the gasket 190 provides friction for retaining the valve body in adjusted position.

As shown in FIGURE 1, the carburetor body 52 is fashioned with a fuel conveying channel 194 in communication with the supplemental fuel chamber 172 and having its outlet in the face of the mounting flange 62 registering with an opening in the sealing gasket 66 and with a fuel conveying passage 198 provided in the manifold member 36. The fuel conveying passage 198 is enlarged as at 200, the passage 200 extending through the insert or member 40 and in register with a passage 202 in the crankcase construction, the outlet or port 204 of passage 202 opening into the cylinder at the region shown in FIGURE 1.

Means is provided for admitting a controlled amount of air into the fuel being delivered through the connecting passages 194, 198, 200 and 202. As shown in FIGURE 1, the manifold member 36 is fashioned with a boss 205 having a bore 206 provided with a threaded region accommodating the threaded portion of an air-adjusting valve body 208.

The valve body has a needle valve portion 212 extending into a restricted passage 214 opening into the passage 200. The bore 206 is provided with an air inlet 216 open to the atmosphere.

The valve body 208 has a knurled head 218 for adjusting the valve, a coil spring 220 disposed between the boss 205 and the head 218 providing friction for retaining the air regulating valve 212 in adjusted position. As shown in FIGURE 1, the interconnecting channels 194, 198, 200 and 202 are arranged to convey fuel from the chamber 172 into the engine crankcase independently of the carburetor mixing passage 54 and the manifold passage 37.

The outlet or port 204 of the idle fuel conveying passage 202 is at a region of the cylinder wall so that the piston 22, during a portion of its reciprocation, obturates, closes or blocks off the outlet 204 to facilitate compressing the idle fuel and air mixture in the crankcase during the major distance of travel of the piston toward the crankcase. Thus, the skirt of the piston forms a valve means for the engine idle fuel delivery system to assure proper delivery and compression of the engine idling mixture in the crankcase.

The operation of the fuel feed system in delivering fuel and air mixture from the carburetor to the engine crankcase for normal and high speed engine operation is as follows: The engine is started by closing the choke valve and opening the throttle during cranking of the engine to deliver an enrichened fuel and air mixture from the mixing passage 54 through the manifold passage 37 into the crankcase. The fuel for normal and high speed engine operation is delivered into the mixing passage through the main orifice 169 provided by the outlet of the counterbore 160 in the fitting 156.

The fuel is delivered from the main orifice into the mixing passage by the aspiration set up in the mixing passage by engine operation. Aspiration is transmitted through the fuel conveying passages, shown in FIGURE 7, to the fuel chamber 82, the aspiration or reduced pressure established therein flexing the diaphragm 88 upwardly. Upward flexure of the diaphragm 88 effects a counterclockwise movement of the lever 120 as viewed in FIGURE 6 to withdraw the inlet valve 110 away from the seat 112 and admit fuel from the fuel pump into the fuel chamber 82. The fuel pump provides a fuel pressure of about three pounds per square inch so that fuel flows into the chamber 82 when the inlet valve 110 is opened.

The fuel for normal and high speed operation is controlled or regulated by manual adjustment of valve 140 and air for the mixture is admitted into the inlet 56 of the mixing passage. When the throttle valve 74 is in slightly opened position, fuel for low engine speed operation is admitted into the mixing passage 54 through the orifice 176. As the throttle 74 is opened a greater amount, fuel flow through the low speed orifice 176 is reduced and fuel for normal and high speed engine operation is delivered through the main orifice 169.

The fuel feed system providing fuel and air mixture for engine idling operation functions as follows: In engine idling position the throttle valve 74 is fully closed so that no air flow occurs in the mixture outlet region 60 of the mixing passage 54 or in the manifold passage 37.

As the piston 22 moves toward the cylinder head on the stroke compressing the mixture in the combustion chamber 26, that is, movement in a right-hand direction as viewed in FIGURE 1, the piston skirt 23 moves beyond or uncovers the port 204, this position of the piston being shown in FIGURE 1.

Movement of the piston in a right-hand direction, as viewed in FIGURE 1, establishes reduced pressure, suction or aspiration in the crankcase. Port 204 is uncovered and fuel flows from the supplemental chamber 172 in the carburetor through the interconnecting passages 194, 198 and 200. The aspiration in the passage 200 is effective to admit air to the fuel through the vent 216 controlled by the air valve 212 to provide a proper mixture of fuel and air delivered through passage 202 into the engine crankcase.

Upon ignition of the mixture in the combustion chamber 26, the piston 22 moves toward the crankcase on a power stroke, the piston skirt 23 obturating or covering the port 204 of the passage 202 to interrupt flow of engine-idling mixture into the crankcase. Further movement of the piston 22, during the power stroke, compresses the fuel and air mixture in the crankcase.

When the piston 22 approaches the limit of its power stroke, the conventional exhaust port (not shown) is uncovered to convey away exhaust gases from the cylinder and the port 46 is uncovered and the compressed mixture in the crankcase delivered through the passage 45 and port 46 into the combustion chamber 26 preparatory to further compression thereof by movement of the piston toward the head of the cylinder.

During this movement of the piston, the port 46 is closed by the piston skirt and the port 204 uncovered whereby mixture is again delivered from the passage 202 through the port 204 into the engine crankcase and the above described cycle repeated.

Through this arrangement there is no fuel in the mixing passage 54 or the mixture outlet 60 thereof to cause puddling so that the fuel and air providing the idling mixture may be accurately controlled to secure proper engine idling irrespective of the position of tilt of the engine and carburetor. The fuel for the engine idling mixture is controlled by the adjustable valve 186, and the air for mixing with the fuel controlled by the adjustable air valve 212.

During engine idling some air is admitted into the supplemental fuel chamber 172 through the low speed orifice 176. This system for engine idling operation provides for more stable engine idling as the arrangement minimizes or reduces the tendency for the wet fuel to collect on the interior walls of the crankcase which, heretofore, has impaired engine idling operation. Improved engine idling is assured in all positions of tilt of the carburetor because there is no tendency for the fuel to puddle adjacent the throttle valve 74.

Figure 10:
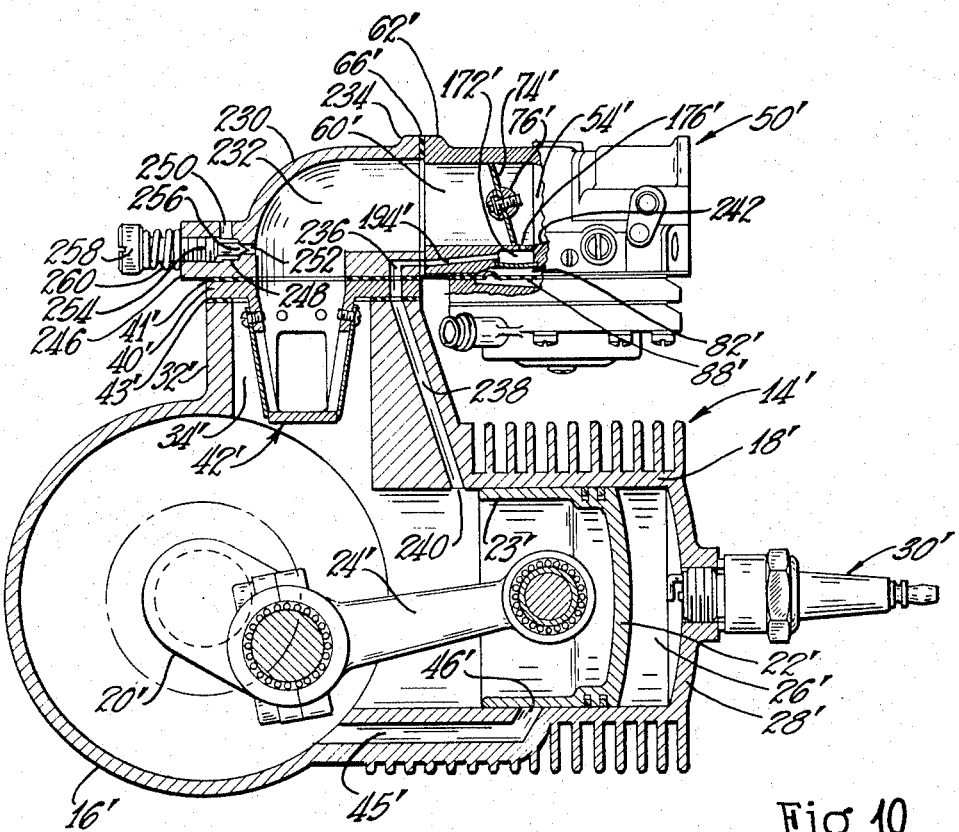
FIGURE 10 is a longitudinal sectional view of a two cycle engine and carburetor and fuel pump associated therewith illustrating a modified form of fuel feed system of the invention.

FIGURE 10 illustrates a modified arrangement for delivering fuel and air into a crankcase of a two cycle engine independently of the mixing passage of the carburetor for engine idling operation.

The engine 14' illustrated in FIGURE 10 is of the same character as shown in FIGURE 1 and includes a crankcase 16', a cylinder 18', a crankshaft 20' journaled in the crankcase, a piston 22' having a skirt portion 23' and a connecting rod 24' articulately joining the crankshaft with the piston, a combustion chamber 26', a cylinder head 28' and conventional spark plug 30'.

The crankcase has a boss portion 32' provided with an opening 34' in which is disposed a conventional reed valve construction 42' supported by a member or insert 40' disposed between sealing gaskets 41' and 43'. A passage 45' in the cylinder construction has an outlet or port 46' for conveying compressed combustible mixture in the crankcase to the combustion chamber 26' when the piston approaches the end of its power stroke. The carburetor 50' is of the same type as shown in FIGURES 1 through 9, having a fuel chamber 82', one wall of which is defined by diaphragm 88', a mixing passage 54', a mixture outlet 60' and a throttle valve 74' journaled on a shaft 76'.

The carburetor has a supplemental fuel chamber 172', a low speed orifice 176' and a fuel conveying passage 194' for conveying idle fuel from the chamber 172' independently of the mixing passage 54'. A manifold 230 of modified construction provides a passage or chamber 232 for conveying mixture for normal and high speed engine operation from the mixture outlet 60' of the carburetor into the crankcase controlled by the reed valve construction 42'. The manifold is fashioned with a flange 234 in registration with the outlet flange 62' of the carburetor, and a sealing gasket 66' disposed between the flanges.

The fuel conveying channel 194' in the carburetor registers with a passage 236 in the manifold construction 230 which is in communication with a passage 238 provided by openings in the gaskets 41' and 43' and the insert 40' and through the crankcase wall, the outlet or port 240 of passage 238 opening into the cylinder 18' at the region shown in FIGURE 10. The carburetor 50' may, if desired, be fashioned with an air bleed passage 242 between the mixing passage 54' and the supplemental fuel chamber 172' whereby a small amount of air is mixed with the fuel delivered through the passages 194, 236 and 238 in addition to the air admitted through the low speed orifice 176' during engine idling.

In the arrangement shown in FIGURE 10, air is admitted into the crankcase for mixing with the fuel and air delivered through the outlet or port 240 and is regulated or controlled by an adjustable air valve associated with the manifold 230. The manifold is fashioned with a boss 246 having a bore 248 and a vent 250 to the atmosphere, the bore 248 being in communication with the manifold chamber 232 through a restricted passage 252.

A valve body 254 is threaded into a threaded portion of the bore 248 and has a needle portion 256 cooperating with the restricted passage 252 for regulating air admitted through the vent 250 into the manifold chamber 232 and past the reed valve construction 42' for mixing with the fuel and air delivered from the port 240.

The valve body 254 has a knurled head 258 for adjusting the valve 256, a coil spring 260 disposed between the boss 246 and the knurled head 258 providing sufficient friction to retain the valve body 254 in adjusted position.

The operation of the arrangement shown in FIGURE 10 is similar to that shown in FIGURE 1. During normal or high speed engine operation when the throttle valve 74' is opened, fuel is delivered by aspiration from the chamber 82' through a main orifice construction of the character shown in FIGURES 7 and 8, the fuel and air mixture being conveyed by the manifold chamber 232 past the reed valve construction 42' and into the crankcase. Additional air enters the manifold 232 past the valve 256 for admixing with the fuel and air mixture for normal and high speed engine operation.

Under engine idling conditions the throttle valve 74' is tightly closed and on the compression stroke of the piston 22' toward the cylinder head 28', reduced pressure or suction is established in the engine crankcase whereby fuel from the supplemental chamber 172 is conveyed into the crankcase through passages 194', 236 and 238 with a small amount of air admitted through the low speed orifice 176' and the bleed passage 242 when the skirt 23' of the piston uncovers the port 240. The additional air necessary to provide a proper ratio of fuel and air for a combustible mixture for engine idling purposes is admitted past the adjustable air control valve 256 past the reed valve construction 42' into the crankcase.

Upon compression of the mixture in the crankcase by movement of the piston away from the cylinder head 28' on a power stroke, the compressed mixture in the crankcase is delivered through the passage 45' and port 46' into the combustion chamber 26' in the conventional manner. The arrangement shown in FIGURE 10 provides for an engine idling mixture in which the fuel for engine idling is controlled by a needle valve such as that shown at 186 in FIGURE 8, and the air controlled by the adjustable air valve 256.

FIGURES 11 through 18 illustrate a further modification of the fuel feed system for supplying an air and fuel mixture for engine idling purposes to an engine crankcase of a two cycle engine independently of the carburetor mixing passage. The engine 14a illustrated in FIGURE 11 is substantially the same as that shown in FIGURE 1 and includes a crankcase 16a, a cylinder 18a, a crankshaft 20a journaled in the crankcase and which is connected with the reciprocable piston 22a by a connecting rod 24a. The combustion chamber is indicated at 26a between the piston and the cylinder head 28a.

The engine crankcase has a boss 32a provided with an entrance or opening 34a in which is disposed a conventional reed valve construction 42a supported by a member 40a. Sealing gaskets 41a and 43a are disposed at opposite sides of the member or insert 40a.

The carburetor 270, forming a component of the fuel feed system of FIGURE 11, is illustrated in FIGURES 11 through 18, and is of a character adapted to be secured directly to the boss 32a on the engine crankcase with the engine side of the carburetor engaging the gasket 41a.

The diaphragm carburetor and diaphragm pump combination includes a carburetor body 272 which is generally cubical in shape embodying components similar to those in the carburetor 50 hereinbefore described. The body 272 may be of cast metal or molded of resinous plastic having a fuel and air mixing passage 276 having an air inlet 278, a Venturi 280 and a mixture outlet region 282. The planar face or surface 284 of the body 272 engages the gasket 41a as shown in FIGURE 11.

Figure 15:
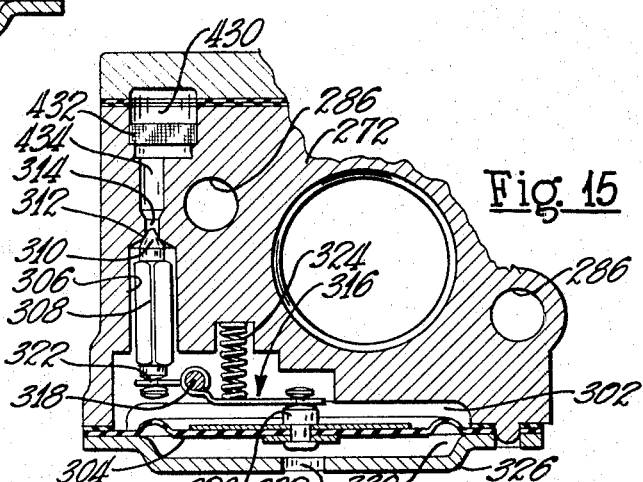
FIGURE 15 is a fragmentary transverse sectional view taken substantially on the line 15—15 of FIGURE 11.

The body 272 is provided with bores 286, shown in FIGURES 13 and 15 extending entirely through the body and receiving bolts (not shown) which extend therethrough and through registering openings in the insert 40a and gaskets 41a and 43a and are threaded into openings (not shown) in the boss 32a of the engine crankcase construction to secure the carburetor and fuel pump construction to the engine crankcase. The bolts may also be utilized to secure an air filter (not shown) adjacent the air inlet 278 to filter the air entering the mixing passage.

A choke valve 288 is mounted upon a shaft 290 journaled in bores in the wall defining the air inlet region 278. The carburetor is equipped with a throttle valve 292 mounted upon a shaft 294 journaled in bores provided in the wall defining the mixture outlet region 282.

An arm 296, shown in FIGURE 13, is secured to one end of the choke valve shaft 290 for manipulating the choke valve. An arm 298 is secured to the throttle shaft 294 for manipulating the throttle valve 292, a spring 300 adjacent the arm 298 biasing the throttle valve toward closed position, viz. the position shown in FIG. 14.

The carburetor is of the diaphragm type wherein the diaphragm is influenced by engine aspiration to control fuel flow into a fuel chamber 302 in the carburetor body for delivery into the mixing passage for normal and high speed engine operation and for delivery of fuel independently of the mixing passage into the engine crankcase for engine idling operation. Extending across the fuel chamber 302 is a flexible diaphragm 304 forming a wall of the chamber 302.

The body 272 is fashioned with a bore 306 of a dimension to slidably accommodate a valve body 308 having a needle valve portion 310 cooperating with a valve seat 312 provided by the surface defining a restricted inlet passage or port 314. A lever 316 disposed in the fuel chamber 302 is fulcrumed upon a fulcrum pin 318, one end region of the long arm of the lever 316 being articulately connected or engaged with a rivet or member 320 carried by the diaphragm 304, and the short arm of the lever 316 being articulately connected as at 322 with the lower end of the inlet valve body 308.

From FIGURE 15 it will be apparent that upward movement of the diaphragm 304 under the influence of reduced pressure or aspiration effects counterclockwise movement of the lever 316 to open the inlet needle valve 310 and admit fuel through the passage 314 into the chamber 302. An expansive coil spring 324 engages the long arm of the lever 316 to normally bias the inlet valve 310 toward closed position. A closure plate 326 for the diaphragm is secured to the carburetor body by screws 328 which extend through openings in the plate and diaphragm 304. The closure plate 326 is fashioned with a central recess 330 to accommodate flexure of the diaphragm 304, the chamber 330 being vented to the atmosphere by a vent opening 332.

Figure 14:
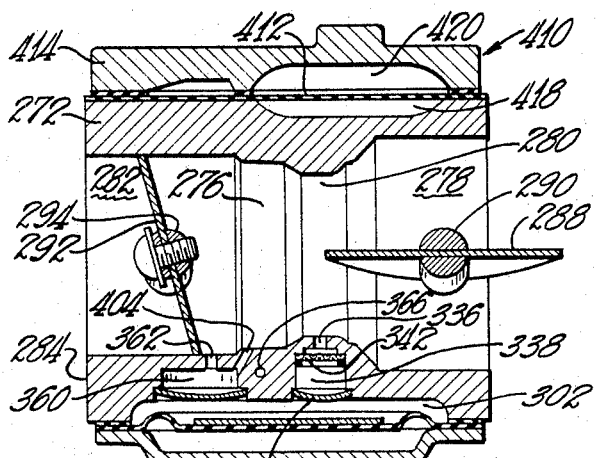
FIGURE 14 is an enlarged longitudinal sectional view through the carburetor and fuel pump, the view being taken substantially on the line 14—14 of FIGURE 11.
Figure 16:
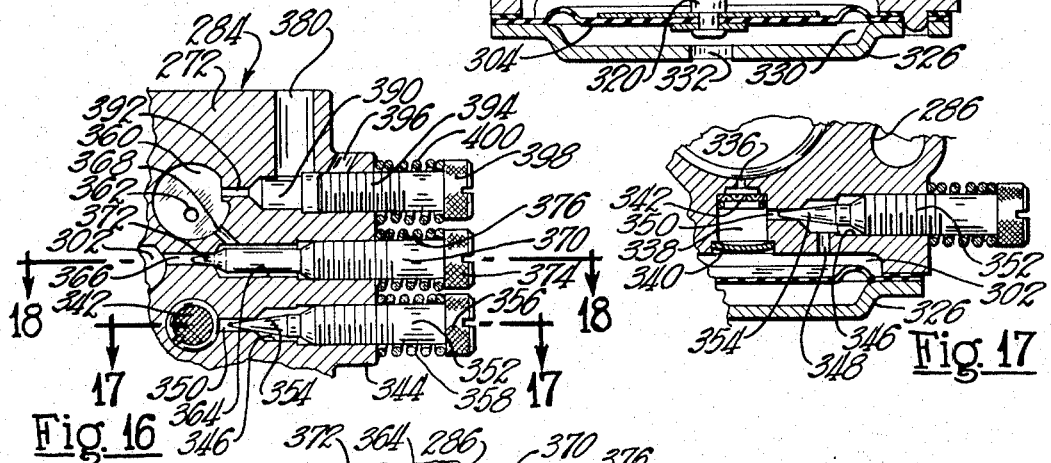
FIGURE 16 is a fragmentary detail sectional view taken on the line 16—16 of FIGURE 12.
Figure 17:
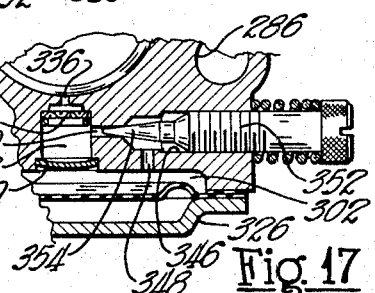
FIGURE 17 is a fragmentary sectional view taken substantially on the line 17—17 of FIGURE 16.
Figure 18:
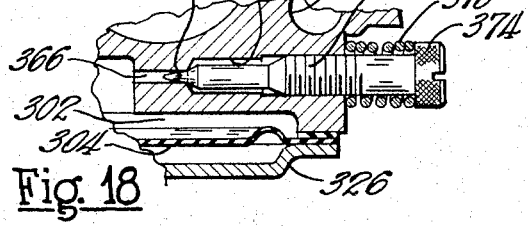
FIGURE 18 is a fragmentary detail sectional view taken substantially on the line 18—18 of FIGURE 16.

The arrangement for conveying or delivering fuel from the fuel chamber 302 into the mixing passage for normal and high speed engine operation is illustrated in FIGURES 14, 16 and 17. The main fuel delivery orifice is illustrated at 336 being an outlet from a well 338 beneath the orifice, the floor of the well being a Welch plug 340.

A fine mesh screen 342 is disposed just beneath the main orifice 336 and liquid fuel adhering to the screen 342 provides a capillary seal means to prevent back bleeding of air through the main orifice into the engine idling system when the latter is delivering fuel directly into the engine crankcase in a manner hereinafter described.

As shown in FIGURES 16 and 17, a boss 344 of the body 272 is fashioned with a bore 346 in communication with the fuel chamber through a fuel duct or passage 348 and with the well 338 through a restricted passage 350.

A wall region of the bore 346 is threaded to accommodate a valve body 352 provided with a needle valve portion 354 which extends into and cooperates with the restricted passage 350 to control or meter fuel flow to the main orifice 336, the valve body 352 being adjustable through its threaded mounting in the bore in the boss 344.

The valve body 352 is fashioned with a knurled head 356 to facilitate adjustment, a coil spring 358 disposed between the boss 344 and the head 356 providing friction to retain the valve body in adjusted position. When the throttle valve 292 is in an open position for normal or high speed engine operation, fuel is aspirated through the passage 348, bore 346, passage 350, well 338 and through the main orifice 336 into the mixing passage where the fuel is mixed with air entering the inlet region to provide the combustible mixture for normal or high speed engine operation.

The carburetor body 272 is formed with a supplemental fuel chamber 360 into which fuel is delivered from the chamber 302 for engine idling purposes and for low speed engine operation. As shown in FIGURE 14, a low speed orifice 362 opens into the mixing passage from the chamber 360 upstream of the throttle valve 292 for delivering fuel into the mixing passage for low speed operation of the engine when the throttle valve 292 is slightly opened. With reference to FIGURE 16, the carburetor body is fashioned with a bore 364 in communication with the fuel chamber 302 by a restricted passage 366 and with the chamber 360 through a passage 368.

A portion of the bore 364 is threaded to accommodate a threaded valve body 370 having a needle portion 372 extending into and cooperating with the passage 366 to regulate fuel flow into the supplemental chamber 360. The valve body 370 is provided with a knurled head 374 for manipulating the valve body, a spring 376 being provided adjacent the head 374 to provide friction to retain the valve 372 in adjusted position.

In the arrangement shown in FIGURES 11 through 18, the fuel for engine idling purposes is conveyed directly from the supplemental chamber 360 into the engine crankcase. With reference to FIGURES 11 and 16, the carburetor body has a passage 380 which opens at the surface 284 of the carburetor. The member 40a is provided with a passage 382 and the gaskets 41a and 43a provided with passages aligned with the passages 380 and 382 as shown in FIGURE 11. The passage 382 registers with a passage 384, the outlet or port 386 of the passage being in the cylinder wall. During certain periods of reciprocation of the piston 22a, the port 386 is uncovered so that fuel from the chamber 360 flows through the passages 380, 382 and 384 into the engine crankcase.

Means is provided for admitting air into the fuel in the passage 380 in the carburetor whereby a mixture or emulsion of fuel and air is delivered into the crankcase independently of the mixing passage 276. As shown in FIGURE 16, the carburetor body is provided with a bore 390 in communication with a passage 380 and with the supplemental fuel chamber 360 through a passage 392.

A portion of the bore 390 is threaded to accommodate the threaded portion of a valve body 394. A portion of the boss 344 adjacent the valve body 394 is provided with a vent 396 open to the atmosphere.

The valve body 394 is provided with a knurled head 398, a coil spring 400 adjacent the head providing friction to hold the valve member 394 in adjusted position. By adjusting the valve 394, the amount of air admitted through the port or vent 396 for mixing with the fuel in the bore 390 may be controlled to provide a combustible mixture for engine idling purposes. The valve member 372 is adjustable to control fuel flow and the valve 394 is adjustable to regulate air admitted to the fuel for engine idling purposes.

Another feature of the arrangement is the compact positioning of the manually adjustable valve bodies 352, 370 and 394 in the relation illustrated in FIGURE 16. Through this arrangement, all of the valves are readily accessible for adjustment at one side of the carburetor. In a chain saw construction, a shroud (not shown) encloses the carburetor and other components not illustrated. Hence the particular positioning of the three valves requiring manual adjustment provides a compact construction and enhances the accessibility of the valves for adjustment.

In FIGURE 14 there is illustrated an air bleed passage 404 between the mixing passage at a region upstream of the throttle valve 292 and the supplemental fuel chamber 360. This air bleed passage is optional in the event that it is desired in certain installations to admit additional air into the fuel chamber 360 to be mixed with the engine idling fuel.

The orifice 362 for delivering fuel from chamber 360 into the mixing passage with the throttle valve 292 in a slightly open position for lower engine speed operation functions to admit air from the mixing passage into the chamber 360 for admixing with the engine idling fuel when the throttle valve 292 is fully closed.

The carburetor arrangement illustrated in FIGURES 11 through 15 includes a fuel pump construction indicated at 410. Disposed at the upper surface of the carburetor body 272 is a pump diaphragm 412, a plate 414 being secured to the carburetor body by screws 416 retains the pumping diaphragm 412 in position as shown in FIGURE 14. The carburetor body 272 is provided with a cavity 418 and the plate 414 provided with a cavity 420, the diaphragm 412 forming a common wall of the cavities. The cavity 418 is a fuel receiving chamber and the cavity 420 a pumping chamber.

The pumping or pulsing chamber 420 is connected by a channel 422 with the crankcase of the engine, the entrance 424 of the pulsing channel opening in the face of the carburetor as shown in FIGURE 13 for registration with a passage in the crankcase wall. Varying fluid pressures developed in the crankcase during engine operation effect pumping action or vibration of the diaphragm 412. Flap valves (not shown) formed integrally with the diaphragm 412 control the flow of liquid fuel into and away from the fuel chamber 418.

The fuel chamber 418 is supplied with fuel from a tank or other supply to a nipple 426 which is in communication with the chamber 418. An outlet passage (not shown) conveys fuel from the chamber 418 to a duct 430 through a filter 432 and passage 434 to the inlet passage 314 adjacent the inlet valve 312, shown in FIGURE 15. As the fuel pump construction forms no part of the present invention it will not herein be described in further detail.

In the arrangement shown in FIGURES 11 through 18, the fuel for normal and high speed engine operation is delivered into the Venturi of the mixing passage through the main orifice 336 and is mixed with air therein, the mixture flowing into the crankcase through the crankcase inlet 34a controlled by the reed valve construction 42a. When the throttle valve 292 is in fully closed or engine idling position, fuel from the fuel chamber 302 flows through passage 366, bore 364, passage 368 through the chamber 360 thence through passages 392, 390, 380, 382 and 384 into the crankcase during the period of reciprocation of the piston 22a when the port 386 is uncovered by the piston skirt.

The air for the idling fuel mixture is derived from the mixing passage through the low speed orifice 362, the optional additional orifice 404 and through the vent opening 396, the air adjustment being obtained by regulation of the position of the air valve 394. Thus the fuel and air for the engine idling mixture is independent of the mixing passage.

In the method, system and arrangement of the invention hereinbefore described, fuel for the engine idling mixture is delivered into the engine crankcase independently of the mixing passage in the carburetor so that a substantially constant fuel and air mixture for engine idling purposes is delivered into the crankcase and puddling of fuel in the mixing passage eliminated. The fuel flow and air flow for establishing the engine idling mixture are individually adjustable so that an accurate proportion of fuel to air may be attained and maintained to secure more efficient operation of the engine at idling speed.

It is apparent that, within the scope of the invention, modifications and different arrangements may be made other than as herein disclosed, and the present disclosure is illustrative merely, the invention comprehending all variations thereof.

We claim:

1. A fuel feed system for supplying combustible fuel and air mixture to the crankcase of a two cycle engine having a piston reciprocating in a cylinder including a carburetor having a body provided with a mixing passage and a throttle valve in the passage, a manifold connected with said mixing passage adapted to deliver fuel and air mixture from said passage into the engine crankcase when the throttle is open, said body having a fuel chamber, a flexible diaphragm forming a wall of the fuel chamber, fuel inlet valve means in said body, means transmitting movement of the diaphragm under the influence of engine aspiration to said inlet valve means to control fuel flow from a supply into the fuel chamber, first fuel channel means including a main orifice opening into the mixing passage for delivering fuel from the chamber into the mixing passage, a port in the cylinder wall of the engine, second fuel channel means in communication with the fuel chamber and said port, said port being disposed whereby the reciprocating piston covers and uncovers the port for controlling delivery of fuel for engine idling operation from the second fuel channel means through the port into the engine crankcase independently of the mixing passage.

2. The combination according to claim 1 wherein the second fuel channel means includes interconnecting passages provided in the carburetor body and the manifold, and adjustable means for admitting air into one of said interconnecting passages for admixing with fuel therein.

3. A fuel feed system for an internal combustion engine of the type having a reciprocating piston in a cylinder wherein combustible mixture is delivered into the crankcase of the engine including, in combination, a carburetor provided with a fuel and air mixing passage and a fuel chamber, orifice means for delivering fuel from the fuel chamber into the mixing passage, means establishing communication of the mixing passage with a first port in the engine crankcase to deliver fuel and air mixture from the mixing passage into the crankcase, one-way valve means associated with said first port preventing reverse flow of mixture to the carburetor, a second port in the cylinder wall of the engine, channel means independent of said mixing passage for conveying fuel from the fuel chamber in the carburetor to the second port, said second port being disposed whereby the reciprocating piston covers and uncovers the second port for controlling delivery of fuel therethrough into the engine crankcase for engine idling operation.

References Cited

UNITED STATES PATENTS

| | | | |
|---|---|---|---|
| 3,353,525 | 11/1967 | Nutten et al. | 123—73 XR |
| 3,361,120 | 1/1968 | Schneider | 123—73 |
| 1,624,024 | 4/1927 | Svensson et al. | |
| 1,969,814 | 8/1934 | Meyer. | |
| 2,759,716 | 8/1956 | Jones | 123—73 XR |
| Re. 24,768 | 1/1960 | Anderson et al. | 123—73 |
| 3,118,009 | 1/1964 | Phillips | 123—119 XR |

WENDELL E. BURNS, *Primary Examiner.*

U.S. Cl. X.R.

261—41, 64